United States Patent
Bernhardt (10) Patent No.: US 7,765,220 B2
(45) Date of Patent: Jul. 27, 2010

(54) DATA RELEVANCE FILTERING (75) Inventor: Gregory L. Bernhardt, Boise, ID (US)

(73) Assignee: Microsoft Corporation, Redmond, WA (US)

(*) Notice: Subject to any disclaimer, the term of this patent is extended or adjusted under 35 U.S.C. 154(b) by 312 days.

(21) Appl. No.: 11/753,043

(22) Filed: May 24, 2007

(65) Prior Publication Data

US 2008/0294601 A1 Nov. 27, 2008

(51) Int. Cl.
*G06F 7/00* (2006.01)
*G06F 17/30* (2006.01)
(52) U.S. Cl. .................. 707/754; 707/603
(58) Field of Classification Search ............. 707/2, 707/200, 1, 100, 7, 3, 102, 603, 607, 737, 707/749, 754, 999.002; 715/210, 760
See application file for complete search history.

(56) References Cited

U.S. PATENT DOCUMENTS

| | | | | |
|---|---|---|---|---|
| 6,279,016 | B1* | 8/2001 | De Vorchik et al. | 715/210 |
| 6,738,770 | B2* | 5/2004 | Gorman | 707/7 |
| 6,842,176 | B2 | 1/2005 | Sang'udi et al. | 345/440 |
| 6,995,768 | B2 | 2/2006 | Jou et al. | 345/440 |
| 6,996,569 | B1* | 2/2006 | Bedell et al. | 707/100 |
| 7,051,025 | B2 | 5/2006 | Kan et al. | 707/6 |
| 7,054,870 | B2 | 5/2006 | Holbrook | 707/10 |
| 7,146,374 | B1 | 12/2006 | Molesky | 707/102 |
| 7,158,992 | B2 | 1/2007 | Megiddo et al. | 707/102 |
| 7,159,188 | B2 | 1/2007 | Stabb et al. | 715/787 |
| 2002/0070953 | A1 | 6/2002 | Barg et al. | 345/700 |
| 2002/0158918 | A1 | 10/2002 | Feibush et al. | 345/853 |
| 2003/0188259 | A1 | 10/2003 | Aureglia et al. | 715/503 |
| 2004/0183800 | A1 | 9/2004 | Peterson | 345/440 |
| 2004/0267770 | A1 | 12/2004 | Lee | 707/100 |
| 2005/0004889 | A1* | 1/2005 | Bailey et al. | 707/1 |
| 2005/0182756 | A1 | 8/2005 | Eppley et al. | 707/3 |
| 2005/0253874 | A1* | 11/2005 | Lal et al. | 345/661 |
| 2005/0267910 | A1* | 12/2005 | Anson | 707/102 |
| 2006/0024980 | A1 | 2/2006 | Tsuchiya et al. | 438/789 |
| 2006/0122981 | A1* | 6/2006 | Jennery | 707/3 |

(Continued)

OTHER PUBLICATIONS

OpenOffice Calc Tips, Data Filtering: Advanced Filter, Oct. 14, 2004, 5 pgs., openofficetips.com/blog/archives/2004/10/data_filtering_2.html.

(Continued)

*Primary Examiner*—Yicun Wu
*Assistant Examiner*—Pavan Mamillapalli
(74) *Attorney, Agent, or Firm*—Merchant & Gould (57) ABSTRACT

Data relevance filtering may be provided. First data comprising a plurality of items may be received. Next, relevance information corresponding to the data may be received. The relevance information may comprise a relevance threshold. Then a filter based upon the received relevance information may foe created and the data may be queried using the created liter to create a result. The result may be limited by the relevance threshold and may include a subset of the plurality of ferns included in the data. Next, the result of the data query may be displayed. The result may include a first portion corresponding to the subset of the plurality of items, a second portion indicting a number of items in the plurality of items minus the number of items in the subset of the plurality of items, and a third portion corresponding to negative items within the plurality of items.

12 Claims, 4 Drawing Sheets

U.S. PATENT DOCUMENTS

| | | | |
|---|---|---|---|
| 2006/0174189 A1 | 8/2006 | Weitzman et al. | 715/503 |
| 2006/0224980 A1* | 10/2006 | Albrecht et al. | 715/760 |
| 2006/0238538 A1 | 10/2006 | Kapler et al. | 345/440 |
| 2006/0293872 A1 | 12/2006 | Zamora et al. | 703/10 |
| 2006/0294069 A1* | 12/2006 | Carlson et al. | 707/3 |
| 2007/0022000 A1 | 1/2007 | Bodart et al. | 705/10 |
| 2007/0073635 A1 | 3/2007 | Vignet | 707/1 |
| 2008/0040372 A1 | 2/2008 | Bissantz | 707/101 |
| 2008/0104127 A1* | 5/2008 | Billmaier et al. | 707/200 |
| 2008/0295007 A1 | 11/2008 | Bernhardt | |

OTHER PUBLICATIONS

OLAP ModelKit™, Interactive Reporting and Data Analysis using Pivot Talc component for .NET Framework, 2007, 2 pgs., perpetuumsoft.com/Product.aspx?lang=en&pid=32.

DynamiCube—ActiveX (.NET ready)—V3.0 SP2—Summary by Data Dynamics—Product Type: Component/ActiveX OCX, 1996-2007, 3 pgs., componentsource.com/products/dynamicube/summary.html.

International Search Report dated Aug. 21, 2008 cited in International Application No. PCT/US2008/063866.

U.S. Appl. No. 11/753,070, filed May 24, 2007.

"Mini-Graphs Tell the Story on a Single Piece of Paper with Bissantz SparkMaker," 3 pgs., Jul. 26, 2006, news.thomasnet.com/fullstory/800116/2585.

Stephen Few, "Dashboard Design for Rich and Rapid Monitoring," 13 pgs., Nov. 2006, bonavistasystems.com/Download2/Dashboard%20Design%20for%20Rich%20and%20Rapid.%20Monitoring.pdf.

Kurt Thearling et al., "Visualizing Data Mining Models," 14 pgs., 2001, thearling.com/text/dmviz/modelviz.htm.

Karen Theisen et al., "DataPlace: Exploring Statistics about Cities," andrew.cmu.edu/user/edisalvo/chi2007workshop/papers/DataPlace-workshopCHi2007-3.pdf.

U.S. Office Action dated Oct. 22, 2009 cited in U.S. Appl. No. 11/753,070.

Edward Tufte, Beautiful Evidence, 2004, Sparklines: Intense, Simple, Word-Sized Graphics; pp. 7-9, 16, 18, and 19.

Charles Williams, Professional Visual Basic 6, Databases, 2000, Wrox Press Ltd., pp. 562 and 563.

U.S. Final Office Action dated Apr. 13, 2010 cited in U.S. Appl. No. 11/753,070.

* cited by examiner

As the user is navigating, with the automatic "relevance" filter on, it combines the irrelevant items into a single line item "(102 more)".

| ▼ Account | ▼ 2005 | ▼ 2006 | ▼ Total |
|---|---|---|---|
| ⊞ 62-000-000-0000-2750 | 2,854,308 | 468,315 | 3,322,623 |
| ⊞ 62-392-000-0000-6271 | 1,954,377 | 276,473 | 2,230,850 |
| ⊞ 62-394-000-0000-6621 | 207,924 | 160,774 | 368,699 |
| ⊞ 62-392-000-0000-6105 | 80,276 | 36,737 | 117,012 |
| ⊞ 62-390-000-0000-6105 | 80,091 | 35,063 | 115,154 |
| ⊞ 62-397-000-0000-6105 | 46,443 | 21,195 | 67,638 |
| ⊞ 62-392-000-0000-6302 | 19,720 | 29,037 | 48,757 |
| (102 more) | 343,394 | 82,973 | 426,368 |
| ⊞ 62-392-000-0000-5710 | -118,297 | | -118,297 |
| ⊞ 62-395-000-0000-5220 | -118,339 | | -118,339 |
| ⊞ 62-000-000-0000-1001 | -455,778 | -260,289 | -716,067 |
| ⊞ 62-390-000-0000-5021 | -994,089 | | -994,089 |
| ⊞ 62-392-000-0000-5412 | 1,045,720 | -381,964 | 1,427,684 |
| Total | 2,854,310 | 468,314 | 3,322,625 |

DATA RELEVANCE FILTERING

RELATED APPLICATION

Related U.S. patent application Ser. No. 11/753,070, filed on even date herewith in the name of Gregory L. Bernhardt and entitled "Data Visualization," assigned to the assignee of the present application, is hereby incorporated by reference.

BACKGROUND

Business intelligence (BI) is a business management term that refers to applications and technologies that are used to gather, provide access to, and analyze data and information about business operations. Business intelligence systems can help companies have a more comprehensive knowledge of the factors affecting their business, such as metrics on sales, production, internal operations, and they can help companies make better business decisions.

Business intelligence applications and technologies can enable organizations to make more informed business decisions, and they may give a company a competitive advantage. For example, a company could use business intelligence applications or technologies to extrapolate information from indicators in the external environment and forecast the future trends in their sector. Business intelligence is used to improve the timeliness and quality of information and enable managers to better understand the position of their company in comparison to its competitors.

Business intelligence applications and technologies can help companies analyze the following: changing trends in market share, changes in customer behavior and spending patterns, customers' preferences, company capabilities and market conditions. Business intelligence can be used to help analysts and managers determine which adjustments are most likely to affect trends.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Data relevance filtering may fee provided. First, data comprising a plurality of items may he received. Next, relevance information corresponding to the data may be received. The relevance information may comprise a relevance threshold. Then a filter based upon the received relevance information may be created and the data may be queried using the created filter to create a result. The result may be limited by the relevance threshold and may include a subset of the plurality of items included in the data. Next, the result of the data query may be displayed. The result may include a first portion corresponding to the subset of the plurality of items, a second portion indicting: a number of items in the plurality of items minus the number of items in the subset of the plurality of items, and a third portion corresponding to negative items within the plurality of items.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings, wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, instead, the proper scope of the invention is defined by the appended claims.

Data relevance filtering may be provided. A user performing data navigation and exploration with a BI tool often navigates into large dimensions with large numbers of irrelevant items, running very long queries. This may break the user's stream of consciousness during navigation. Consistent with embodiments of the present invention, this problem may be solved by applying a "relevance filter" to data sets to show the user the most important data first.

When executing a query with embodiments of the invention, a relevance filter may be applied to combine the less relevant items into a displayed single value. In this way, the relevance filter may be applied to queries to allow a user to quickly see what items are important and remove unimportant items. Some conventional systems use a decomposition tree that shows only top items and then combines bottom items. However, these conventional systems takes, the top items based on the size of the screen, not on how many items are actually relevant. These conventional systems do not take into account large negative values that may be relevant. Moreover, other conventional systems automatically filter to the first n items in a query, but do not necessarily filter to the most relevant. Rather the other conventional systems just filter to the first n items so that the query returns faster.

Figure 1:
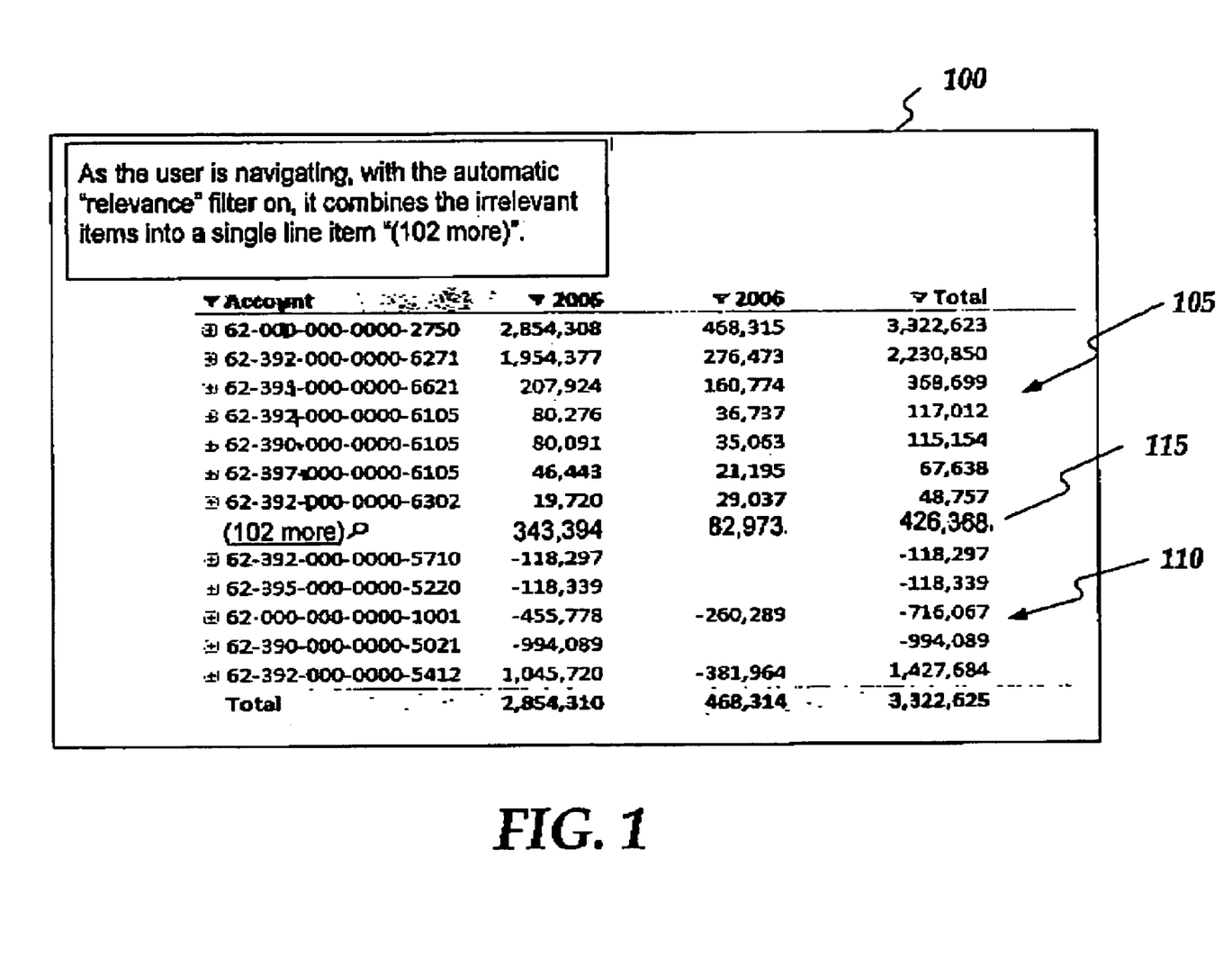
FIG. 1 is a diagram showing a data display window.

FIG. 1 is a diagram showing a data display window 100. For example, window 100 shows a display where the relevance filter has been applied. Without the relevance filter, 114 items may have been shown to the user, with the middle 102 items comprising less than 5% of the total. The relevance filter may be implemented in many ways, for example, with multidimensional data (e.g. OLAP data). This could be accomplished by running multiple queries to determine the top and bottom data sets, and then combining the results. Data display window 100 of FIG. 1 will be described in greater detail below.

Figure 2:
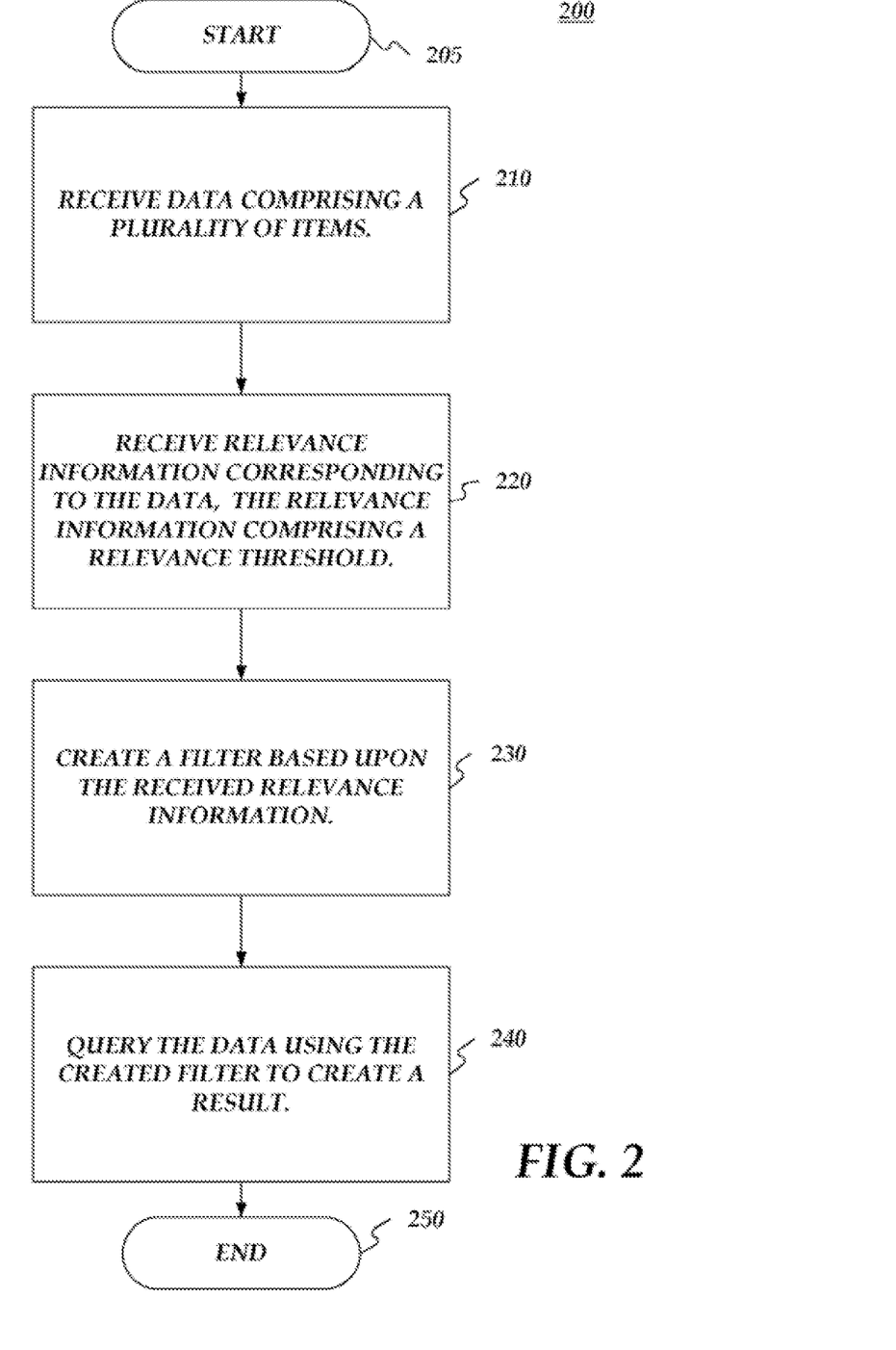
FIG. 2 is a flow chart of a method for providing data relevance filtering.
Figure 3:
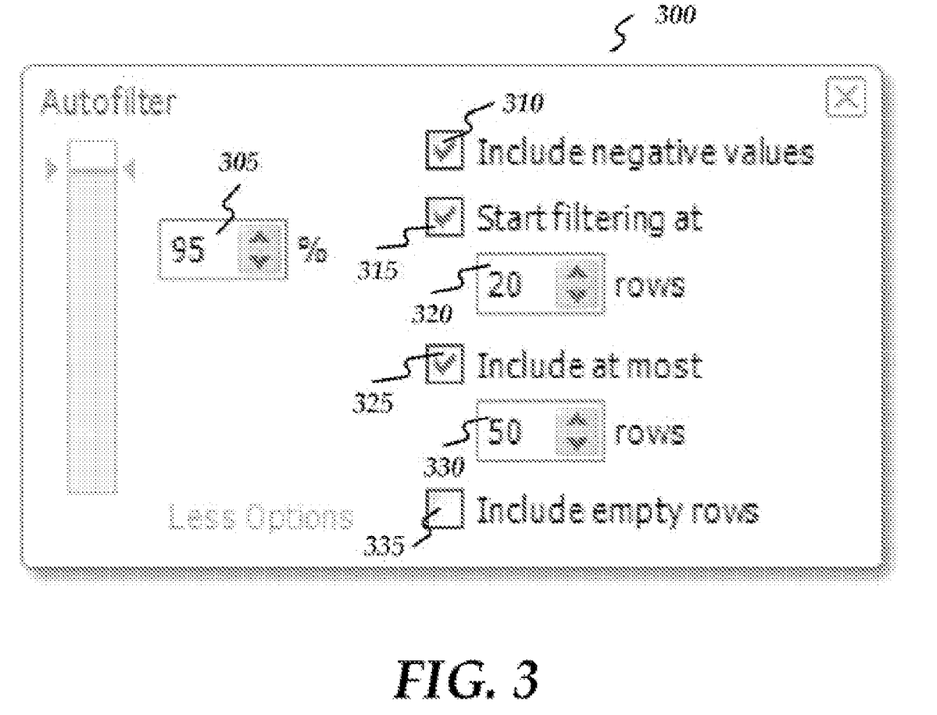
FIG. 3 is a diagram showing a relevance information input window.

FIG. 2 is a flow chart setting forth the general stages involved in a method 200 consistent with an embodiment of the invention for providing data relevance filtering. Method 200 may be implemented using a computing device 400 as described in mere detail below with respect to FIG. 4. Ways to implement the stages of method 200 will be described in greater detail below. Method 200 may begin at starting block 205 and proceed to stage 210 where computing device 400 may receive data comprising a plurality of items. For example, the data may comprise any scientific or business data such as metrics on sales, production, or internal operations. The aforementioned are examples and the received data may comprise any data. As shown in the FIG. 1 example, the data may comprise yearly sales data corresponding to respective account numbers, From stage 210, where computing device 400 receives the data comprising the plurality of items, method 200 may advance to stage 220 where computing device 400 may receive relevance information corresponding to the data. The relevance information may comprise a relevance threshold. For example, computing device 400 may present, the user with a relevance information input window 300 as shown in FIG. 3. For example, there may be at least five factors to consider when determining a relevant set of items to display given a particular set of items (e.g. the data).

A first factor may comprise indicating how much relevance should be considered. In the example shown in FIG. 1 and in FIG. 3, a relevance threshold of 95% may be entered in a first data input element 305 by the user. Consequently, a top 95% of items 105 may be included in window 100, in other words, the relevance threshold may be configured to indicate a percentage of a sum of the plurality of items that corresponds to the subset of the plurality of items.

A second factor may comprise indicating whether to include negative values in the display, in many cases, the user may need to include negative items (e.g. negative values 110) to fully understand relevance. In this case, a large negative account may be a significant driver of the total. Without these accounts included, the user may be missing a big part of the data picture. Consequently, the user may check a second data input element 310 as an indication that negative numbers are to be included in the result.

A third factor may comprise an indication indicating whether to start filtering at x items. The user may not want to filler if there is a small set of items to begin with. For example, if there are only 15 items, the user may rather see them all, instead of filtering to the 3 or 4 items that comprise the top 95% of sales. Consequently, the user may check a third data input element 315 as an indication indicating a minimum number of items in the plurality of items must be include before the data is queried. The user may enter a value for the minimum number of items in input box 320.

A fourth factor may comprise an indication indicating whether to include at most y items. In a large, evenly distributed set of items, the user may not want to return too large a set. For example, if there are 10,000 customers, each with $100 in salts, the 95% would be a list of 9,500 customers. This may be too much for the user to care about. In this case, the relevance indicator can "max out" at a certain number of items. Consequently, the user may check a fourth data input element 325 as an indication indicating that a maximum number of items should be included in the subset of the plurality of items. The user may enter a value for the maximum number in input box 330.

A fifth factor may comprise an indication indicating whether to include empty items. For example, the user may or may not want to see items with no data. Consequently, the user may check a fifth data input element 335 as an indication indicating that items having no value are to be excluded from the subset of the plurality of items.

Once computing device 400 receives relevance information in stage 220, method 200 may continue to stage 230 where computing device 400 may create a filter based upon the received relevance information. For example, computing device 400 may create the filter based on the information the user entered into relevance information input window 300 as described above.

After computing device 400 creates the filter in stage 230, method 200 may proceed to stage 240 where computing device 400 may query the data using the created filter to create a result. The result may be limited by the relevance threshold and including a subset of the plurality of items included in the data. Computing device 400 may display the result of the data query. For example, displaying the result may comprise displaying the result including a first portion (e.g. items 105) corresponding to the subset of the plurality of items, a second portion 115 indicting a number of items in the plurality of items minus the number of items in the subset of the plurality of items, and a third portion (e.g. negative values 110) corresponding to negative items within the plurality of items corresponding to the threshold. Once computing device 400 creates and displays the result in stage 240, method 200 may then end at stage 250.

An embodiment consistent with the invention may comprise a system for providing data relevance filtering. The system may comprise a memory storage and a processing unit coupled to the memory storage. The processing unit may be operative to receive relevance information corresponding to data. The relevance information may comprise a relevance threshold. The processing unit may also be operative to create a filter based upon the received relevance information. In addition, the processing unit may be operative to query the data using the created filter to create a result. The result may he limited by the relevance threshold and including a subset of a plurality of items included in the data.

Another embodiment consistent with the invention may comprise a system for providing data relevance filtering. The system may comprise a memory storage and a processing unit coupled to the memory storage. The processing unit may be operative to receive data comprising a plurality of items and to receive relevance information corresponding to the data. The relevance information may comprise a relevance threshold. Furthermore, the processing unit may be operative to create a filter based upon the received relevance information and to query the data using the created filter to create a result. The result may be limited by the relevance threshold and including a subset of the plurality of items included in the data. Moreover, the processing unit may be operative to display the result of the data query. Displaying the result may comprise displaying the result including: i) a first portion corresponding to the subset of the plurality of items; ii) a second portion indicting a number of items in the plurality of items minus the number of items in the subset of the plurality of items; and iii) a third portion corresponding to negative items within the plurality of items corresponding to the threshold.

Yet another embodiment consistent with the invention may comprise a system for providing data relevance filtering. The system may comprise a memory storage and a processing: unit coupled to the memory storage. The processing unit may be operative to create a filter based upon relevance information comprising a relevance threshold, in addition, the processing unit may be operative to query data using the created filter to create a result. The result may be limited by the relevance threshold and including a subset of a plurality of items included in the data.

Figure 4:
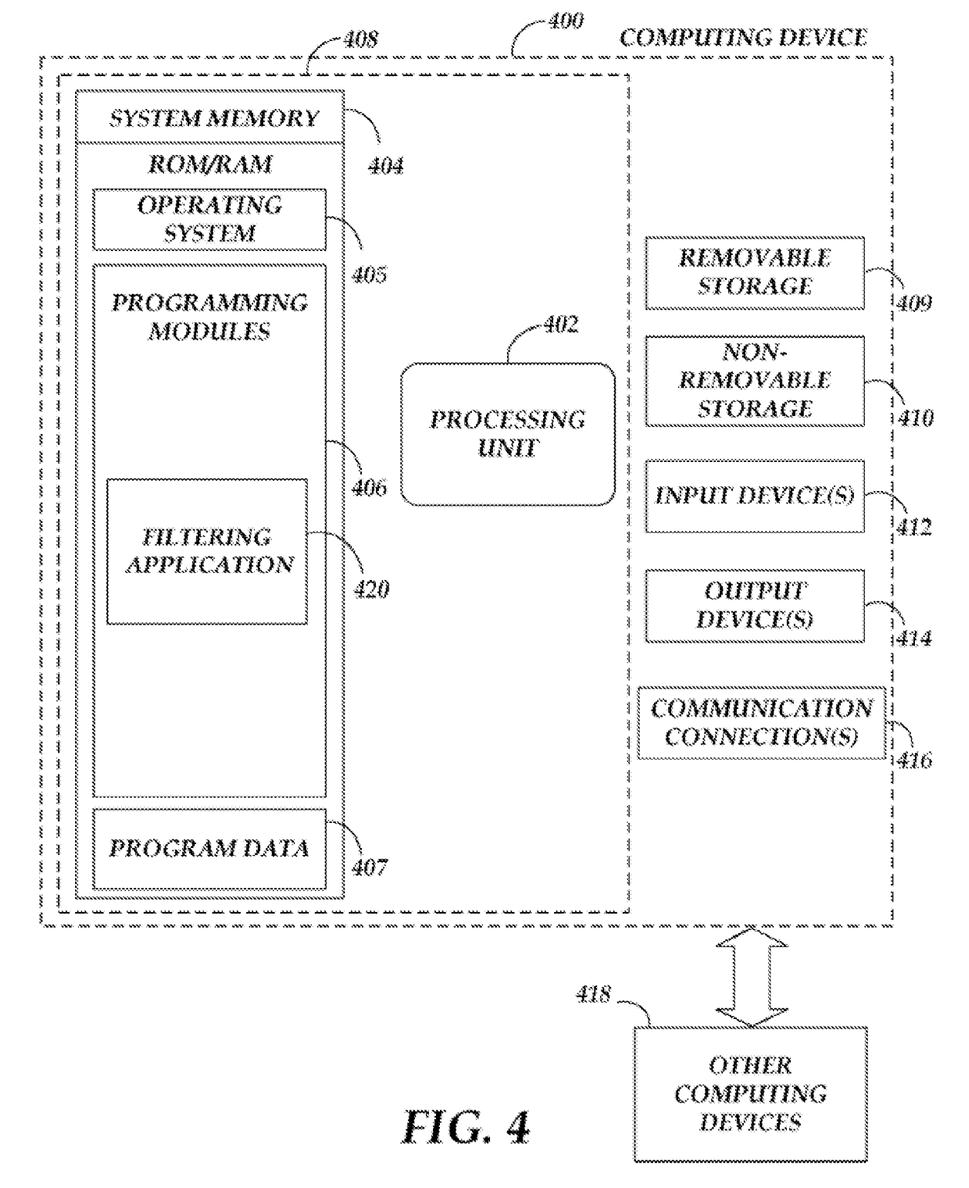
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include, for example, a filtering application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated m FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can he accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that bas one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. filtering application 420) may perform processes including, for example, one or more method 200's stages as described above. The aforementioned process is an example, and processing unit 402 may perform ether processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing data relevance filtering, the method comprising:
    receiving relevance information corresponding to data, the relevance information comprising a relevance threshold, wherein receiving the relevance information comprises receiving the relevance information from at least one user input, the at least one user input indicating to include negative values in the data relevance filtering;
    creating a filter based upon the received relevance information;
    querying the data using the created filter to create a result, the result being limited by the relevance threshold and including a subset of a plurality of items included in the data, the relevance threshold being configured to indicate a percentage of a sum of the plurality of items that corresponds to the subset of the plurality of items;
    combining negative items associated with the negative values included in the result into a single item representing the combined negative items, the combined negative items corresponding to irrelevant items within the result; and
    displaying the result of the data query, wherein displaying the result comprises displaying the result comprising:
    a first portion corresponding to the subset of the plurality of items,
    a second portion indicting a first number of items in the plurality of items minus a second number of items in the subset of the plurality of items, and
    a third portion corresponding to negative items within the plurality of items corresponding to the threshold.

2. The method of claim 1, further comprising receiving the data comprising the plurality of items.

3. The method of claim 1, wherein receiving the relevance information corresponding to the data comprises receiving, from a checkbox data element, the relevance information including an indication indicating that the negative values are to be included in the result.

4. The method of claim 1, wherein receiving the relevance information corresponding to the data comprises receiving the relevance information including an indication indicating a minimum number of items the plurality of items must include before the data is queried.

5. The method of claim 1, wherein receiving the relevance information corresponding to the data comprises receiving the relevance information including an indication indicating a maximum number of items to be included in the subset of the plurality of items.

6. The method of claim 1, wherein receiving the relevance information corresponding to the data comprises receiving the relevance information including an indication indicating that items having no value are to be excluded from the subset of the plurality of items.

7. A computer-readable storage medium which stores a set of instructions which when executed performs a method for providing data relevance filtering, the method executed by the set of instructions comprising:
    receiving data comprising a plurality of items;
    receiving relevance information corresponding to the data, the relevance information comprising a relevance threshold, wherein receiving the relevance information comprises receiving the relevance information from at least one user input of a plurality of user inputs, the at least one user input of the plurality of user inputs indicating to include negative values in the data relevance filtering;

creating a filter based upon the received relevance information;

querying the data using the created filter to create a result, the result being limited by the relevance threshold and including a subset of the plurality of items included in the data, the relevance threshold being configured to indicate a percentage of a sum of the plurality of items that corresponds to the subset of the plurality of items; and displaying the result of the data query wherein displaying the result comprises displaying the result comprising:

a first portion corresponding to the subset of the plurality of items, a second portion indicting a first number of items in the plurality of items minus a second number of items in the subset of the plurality of items, and a third portion corresponding to negative items within the plurality of items corresponding to the threshold, wherein displaying the result including the third portion corresponding to the negative items comprises displaying a single item representing a combination of the negative items.

8. The computer-readable storage medium of claim 7, wherein receiving the relevance information corresponding to the data comprises receiving, from a checkbox data element, the relevance information including an indication indicating that the negative values are to be included in the result.

9. The computer-readable storage medium of claim 7, wherein receiving the relevance information corresponding to the data comprises receiving the relevance information including an indication indicating a minimum number of items the plurality of items must include before the data is queried.

10. The computer-readable storage medium of claim 7, wherein receiving the relevance information corresponding to the data comprises receiving the relevance information including an indication indicating a maximum number of items to be included in the subset of the plurality of items.

11. The computer-readable storage medium of claim 7, wherein receiving the relevance information corresponding to the data comprises receiving the relevance information including an indication indicating that items having no value are to be excluded from the subset of the plurality of items.

12. A system for providing data relevance filtering, the system comprising:

a memory storage; and a processing unit coupled to the memory storage, wherein the processing unit is operative to:

provide a relevance information input window operative to gather relevance information, the relevance information input window comprising:

a first data selection element operative, upon selection, to include negatively valued data items in a search result, a second data selection element operative, upon selection, to include a minimum number of data items in the search result, a third data selection element operative, upon selection, to include a maximum number of data items in the search result, a fourth data selection element operative, upon selection, to exclude data items having no value, and a fifth data selection element operative, upon selection, to indicate a relevance threshold;

create a filter based upon the relevance information comprising the relevance threshold;

query data using the created filter to create a result, the result being limited by the relevance threshold and including a subset of a plurality of items included in the data and being configured to indicate a percentage of a sum of the plurality of items that corresponds to the subset of the plurality of items;

combine negative items associated with the negative values included in the result into a single item representing the combined negative items; and display the result of the data query comprising:

a first portion corresponding to the subset of the plurality of items, a second portion indicting a first number of items in the plurality of items minus a second number of items in the subset of the plurality of items, and a third portion corresponding to negative items within the plurality of items corresponding to the threshold.

* * * * *